United States Patent
Graef et al.

(10) Patent No.: US 8,540,144 B2
(45) Date of Patent: Sep. 24, 2013

(54) AUTOMATED BANKING MACHINE OPERATED RESPONSIVE TO DATA BEARING RECORDS WITH IMPROVED SECURITY

(71) Applicant: Diebold, Incorporated, North Canton, OH (US)

(72) Inventors: H. Thomas Graef, Bolivar, OH (US); Paulo de Jesus Andrade Monteiro, São Paulo (BR); Eidi Nakagawa, Osasco (ES); Elcio Fukushima, Osasco (ES)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 13/629,217

(22) Filed: Sep. 27, 2012

(65) Prior Publication Data

US 2013/0075467 A1      Mar. 28, 2013

(30) Foreign Application Priority Data

Sep. 28, 2011   (BR) ........................................ 1106243
Feb. 3, 2012   (BR) ........................ 13 2012 002616 2

(51) Int. Cl.
*G07F 19/00*      (2006.01)

(52) U.S. Cl.
USPC ........................................... 235/379; 235/380

(58) Field of Classification Search
USPC .................... 235/379, 380; 705/9, 14, 16, 35
See application file for complete search history.

(56) References Cited

U.S. PATENT DOCUMENTS

| 7,331,515 B1* | 2/2008 | Blackson et al. | 235/379 |
| 2002/0152166 A1* | 10/2002 | Dutta et al. | 705/43 |
| 2009/0114716 A1* | 5/2009 | Ramachandran | 235/379 |
| 2009/0145959 A1* | 6/2009 | VanKirk et al. | 235/379 |

* cited by examiner

*Primary Examiner* — Allyson Trail
(74) *Attorney, Agent, or Firm* — Black, McCuskey, Souers & Arbaugh, L.P.A.

(57) ABSTRACT

An automated banking machine is operative to cause financial transfers responsive to data read from data bearing records, such as user cards. The machine includes a reader device operative to read data usable to identify a financial account authorized for use in conducting a transaction through the machine. An authorized machine user is able to use the machine to perform transactions, including financial transfers, cash dispensing, and other actions associated with financial accounts. The machine includes a safe having two sections separated by a shared wall structure. A cash handling arrangement is operative to transport cash between the two sections through a slot in the wall structure.

20 Claims, 16 Drawing Sheets

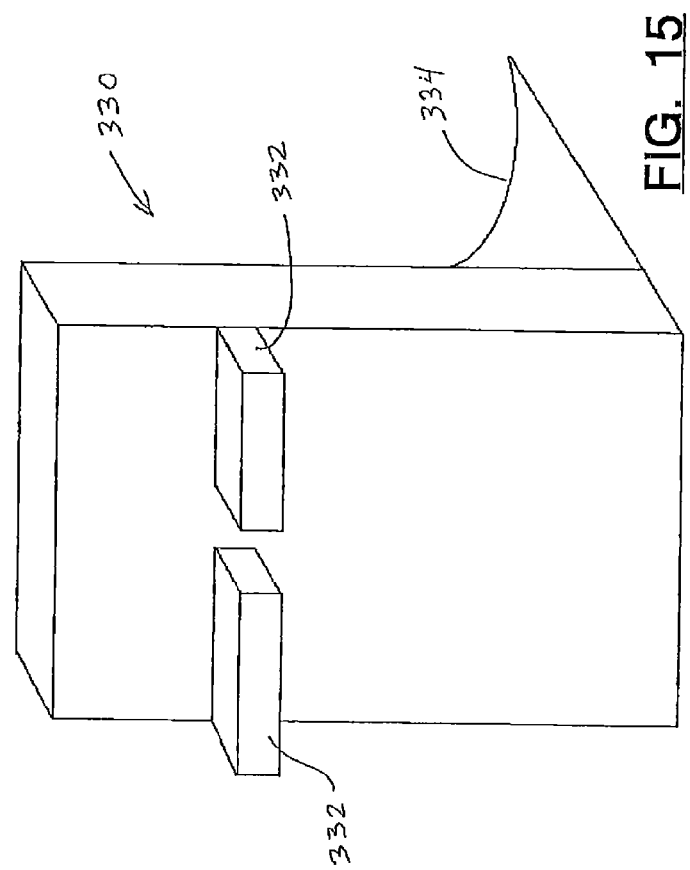

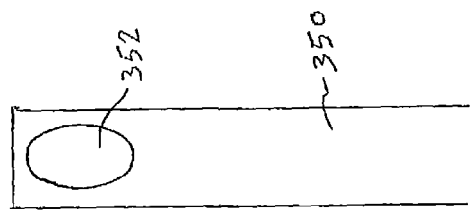
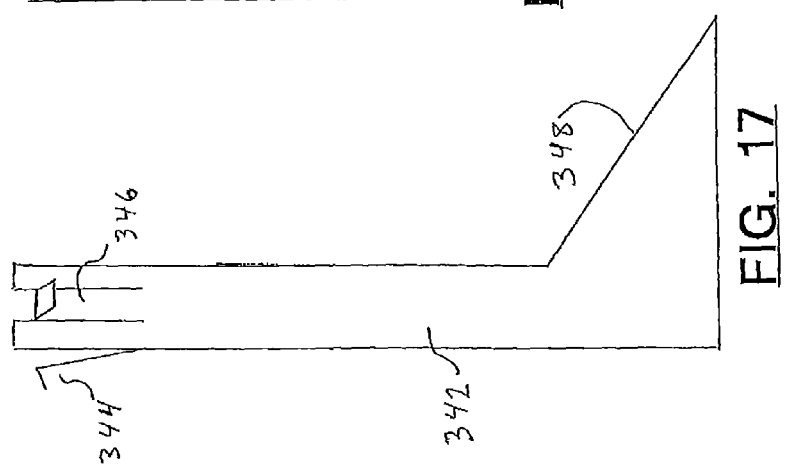
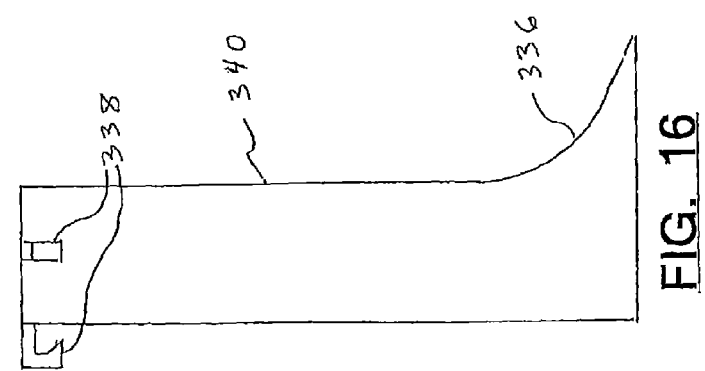

US 8,540,144 B2

AUTOMATED BANKING MACHINE OPERATED RESPONSIVE TO DATA BEARING RECORDS WITH IMPROVED SECURITY

CROSS-REFERENCE TO RELATED APPLICATIONS

This application claims priority pursuant to 35 U.S.C. §119 to Brazil Patent Applications PI 1106243-6 filed Sep. 28, 2011 and BR 13 2012 002616 2 (certificate of addition) filed Feb. 3, 2012, which Applications are herein incorporated by reference in their entirety.

TECHNICAL FIELD

This invention relates to banking system machines that are operable to cause financial transfers responsive at least in part to data read from data bearing records such as user cards, and which subject matter may be currently classifiable in U.S. Class 235, Subclass 379. Certain banking machines of a banking system can be controlled by information sensed from data bearing records. The banking system causes indicia from a bearer card or record to be compared with computer information regarding the bearer. The banking system can also cause credit to be reallocated among various accounts. Some automated banking machines of the banking system can keep a check upon financial transactions. A machine can comprise a cash storage device, and also registering devices or equivalents to disclose to the machine user an amount of a transaction. The machine can make an autographic record of the transaction upon a movable strip of paper, and also move the paper. The machine can further comprise various subordinate devices for the purpose of compelling the user to correctly operate the machine. Thus, the invention relates to certain banking machines that may be viewed as registers for purposes of Class 235.

BACKGROUND OF INVENTION

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, account balance inquiries, the payment of bills, the cashing of checks, and the purchase of items. The types of banking transactions a customer can carry out at an automated banking machine are determined by the capabilities of the particular banking machine, the capabilities of the system in which it is connected, and the programming of the machine by the entity responsible for its operation.

Automated banking machines can include a secure enclosure which may be referred to as a safe, vault, or chest. The secure enclosure is configured to house critical components and/or valuable documents. For example, the secure enclosure may house currency notes, cash dispensers, and other banking machine components.

A common type of self-service automated banking machine used by customers is an automated teller machine ("ATM"). For purposes of this disclosure an automated banking machine, automated transaction machine, or an automated teller machine shall be deemed to include any machine that can be operated to automatically carry out transactions involving transfers of value.

DISCLOSURE OF INVENTION

It is an object of an exemplary embodiment to provide an automated banking machine that operates responsive to data bearing records.

It is a further object of an exemplary embodiment to provide an automated banking machine with improved capabilities.

It is a further object of an exemplary embodiment to provide a more secure automated banking machine.

It is a further object of an exemplary embodiment to provide an automated banking machine which reduces the risk of unauthorized access to valuables located in the machine.

It is a further object of an exemplary embodiment to provide an automated banking machine comprising a secure enclosure that is configured to be less susceptible to breach that may be caused due to explosives inserted into the machine. The secure enclosure comprises segmented compartments. The section of the enclosure that has a user accessible opening is separated from the enclosure section that stores the currency. As a result of the configuration, the currency storage section of the secure enclosure can be preserved despite an explosion caused by an explosive inserted into the user accessible opening. The secure enclosure configuration causes the damaging effects of the explosion to be kept away from the currency storage section of the enclosure.

Further objects of exemplary embodiments will be made apparent in the following Detailed Description and the appended claims.

BRIEF DESCRIPTION OF THE DRAWINGS

FIG. 15 shows an exemplary embodiment of a portable test piece.

FIGS. 16-19 shows other exemplary portable test structure.

DETAILED DESCRIPTION

Figure 1:
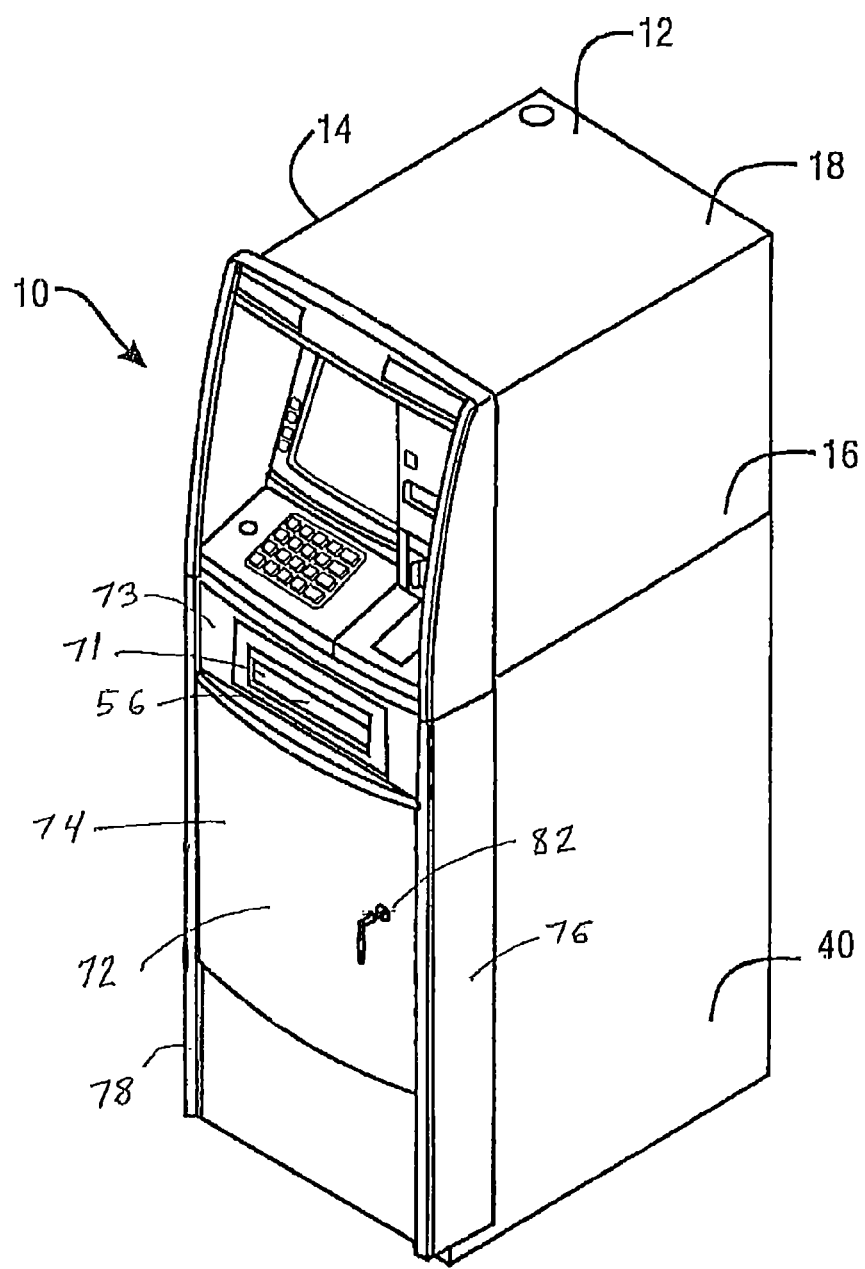
FIG. 1 is an isometric view of an automated banking machine of an exemplary embodiment.
Figure 2:
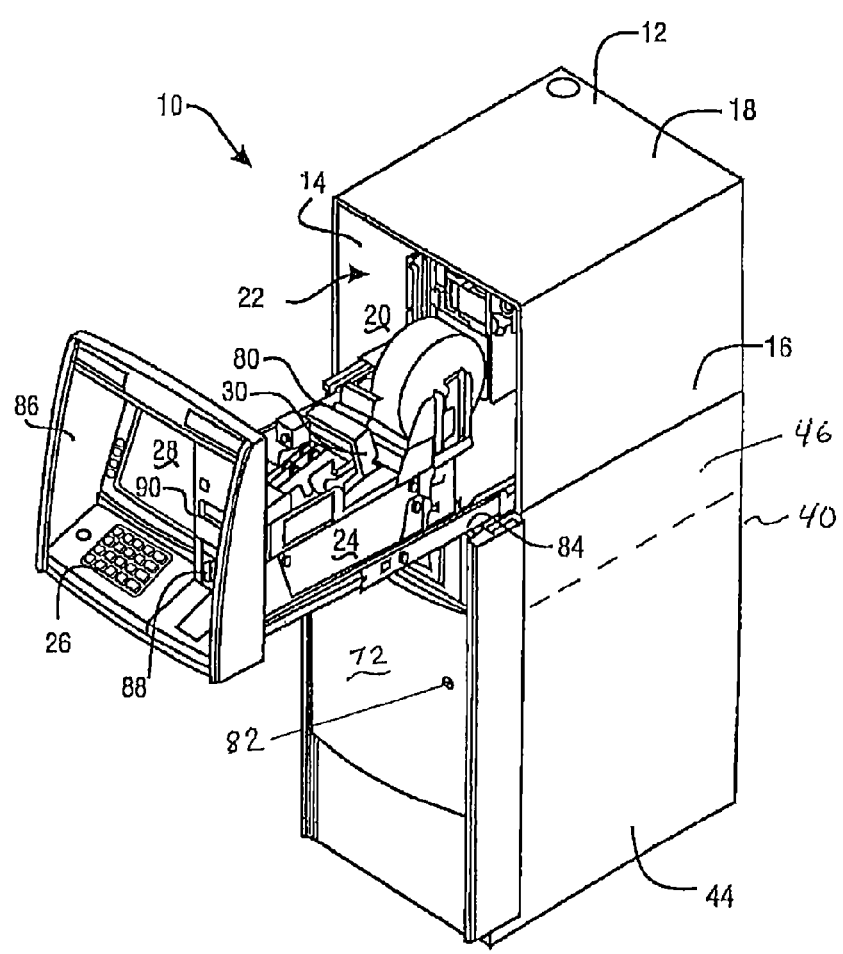
FIG. 2 is an isometric view of the automated banking machine of FIG. 1 with a rollout tray extended.

FIGS. 1 and 2 show therein an automated banking machine 10 of a first exemplary embodiment. The automated banking machine 10 includes a top housing 12 having side walls 14, 16, and a top wall 18. The housing 12 encloses an interior area 20. The housing 12 also has a front opening 22. The rear of the housing 12 is closed by a rear wall. However, in other embodiments, the rear of the housing may be accessible through an access door or similar device. The housing 12 is used to house certain banking machine components, such as input and output devices.

Figure 3:
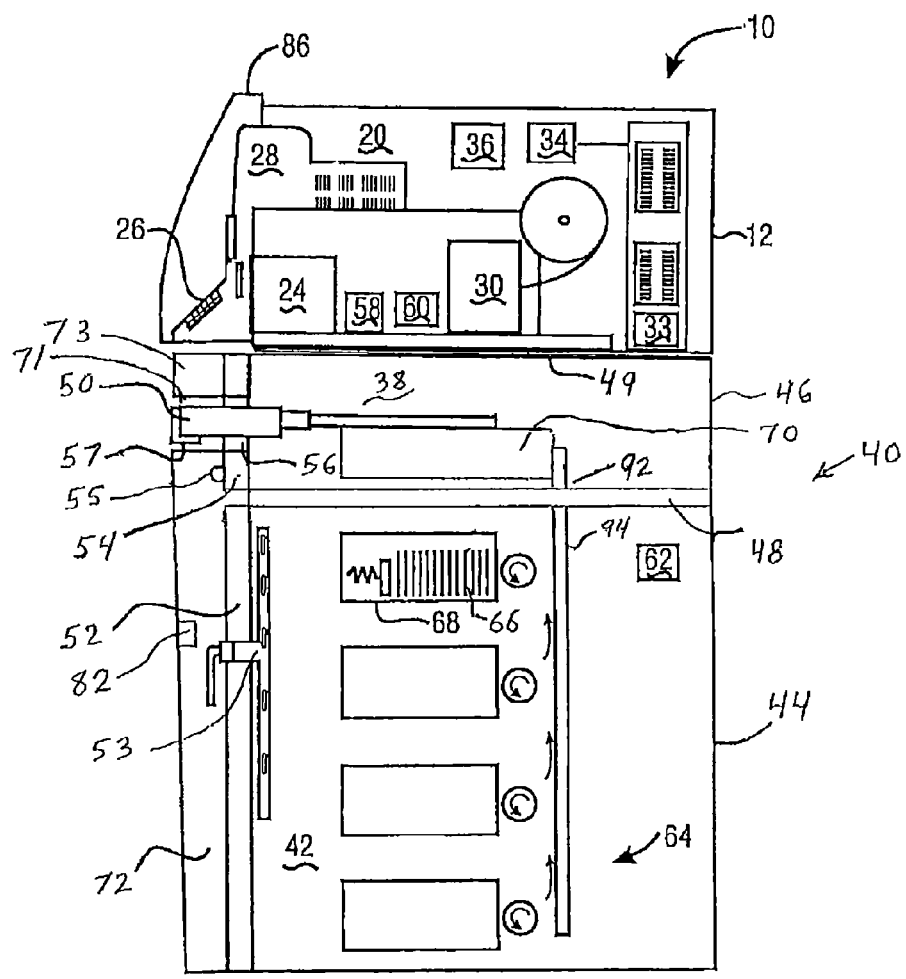
FIG. 3 is a side schematic view illustrating various components of the automated banking machine of FIG. 1.

With reference to FIG. 3, the input devices include a card reader 24 that is operative to read a customer's card which includes data thereon. The indicia data on the card may correspond to information about the customer and/or information about a customer's financial account, such as the customer's account number. In some embodiments the card reader 24 may be a card reader adapted for reading magnetic stripe cards and/or so called "smart cards" which include a programmable memory. Other embodiments may read data from cards wirelessly such as RFID cards. Exemplary embodiments may include features of the type discussed in U.S. Pat. No. 7,118,031, the disclosure of which is incorporated herein by reference in its entirety.

Another input device in the exemplary embodiment includes user input keys 26. The keys 26 may be arranged in a keypad or keyboard. Input keys 26 may alternately or in addition include function keys or other types of devices for receiving manual inputs. It should be understood that in various embodiments other types of input devices may be used, such as biometric readers, speech or voice recognition devices, inductance type readers, IR type readers, and other devices capable of communicating with a person, article, or computing device, radio frequency type readers and other types of devices which are capable of receiving information that identifies a customer and/or their account.

The machine 10 also includes output devices that can provide outputs to a customer. The machine 10 includes at least one display 28. A display 28 may include a LCD, CRT, or other type display that is capable of providing visible indicia to a customer. Other output devices may include audio speakers, RF transmitters, IR transmitters, or other types of devices that are capable of providing outputs which may be perceived by a user either directly or through use of a computing device, article, or machine. It should be understood that embodiments may also include combined input and output devices such as a touch screen display which is capable of providing outputs to a user as well as receiving user inputs.

The machine 10 also includes a receipt printer schematically indicated 30. The receipt printer is operable to print paper transaction receipts for users of the machine. The receipt printer 30 can be of the type discussed in the disclosure of U.S. Pat. No. 5,850,075, which is herein incorporated by reference in its entirety.

The machine can include other types of printing mechanisms, such as a statement printer mechanism, a ticket printing mechanism, a check printing mechanism, and other devices that operate to apply indicia to media in the course of performing transactions carried out with the machine.

The machine 10 further includes one or more processors schematically indicated 33. Processor 33, alternately referred to as a computer or a controller, is in operative connection with at least one memory or data store 34. The processor 33 is operative to carry out programmed instructions to achieve operation of the machine in accomplishing transactions. The processor 33 is in operative connection with a plurality of the transaction function devices in the machine.

The machine 10 includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers, or other devices suitable to enable communication (including communication via private and/or public networks such as the Internet) between the machine 10 and other computers and systems. Exemplary embodiments may include features like those disclosed in U.S. Pat. No. 7,266,526, the disclosure of which is incorporated herein by reference in its entirety.

The machine 10 further includes a secure enclosure 40 that encloses secure areas 38, 42. The secure enclosure 40 may also be referred to herein as a vault, safe, or chest. The dual (split) vault 40 includes a lower chest 44 and an upper chest 46. The lower chest 44 comprises walls, including a top wall 48. The top wall 48 may be thicker than the other lower chest walls. The lower chest 44 encloses the secure area 42. The lower chest 44 is used to house critical components and valuable documents. For example, the lower chest 44 can be used for housing currency, currency dispensers, currency stackers, and other banking machine components. Cash dispensers may include features of the type disclosed in U.S. Pat. Nos. 7,261,236; 7,240,829; 7,114,006; 7,140,607; and 6,945,526 the disclosures of which are incorporated herein by reference in their entirety.

The top wall 48 of the lower chest 44 includes a transport opening 92 (e.g., a slot) therethrough. The opening 92 allows a transport device 94 to move sheets (e.g., currency notes) between the lower chest 44 and the upper chest 46. In an exemplary embodiment the opening 92 is the only connecting passage between the upper chest and the lower chest. The top wall 48 may also be sloped in a manner (e.g., upward) that directs or keeps explosion-caused forces away from the transport opening 92.

The lower chest 44 includes a lower chest door 52 that is movably mounted in supporting connection with a wall of the lower chest 44. The lower chest door 52 is generally closed to secure the contents of the lower chest 44. The lower chest door 52 includes a locking mechanism 53.

The upper chest 46 encloses the secure area 38. The top housing 12 is supported on the upper chest 46 such that the secure area 38 is positioned generally below the top housing's interior area 20. The upper chest 46 is used to house a currency stacker mechanism 70 and a delivery mechanism 50. The stacker device 70 can operate to form a stack of sheets, such as currency notes. The delivery device 50 can operate to present the formed stack to a machine user. The delivery device 50 may be alternatively referred to herein as a cash presenter. In other embodiments the sheet stacker can be positioned at other vertical levels instead of below the presenter. For example, the stacker may be at substantially the same vertical level as the cash presenter 50, where a sheet transport path of the stacker is horizontally aligned with a sheet transport path of the presenter.

The upper chest 46 comprises walls, including a top wall 49. The upper chest 46 includes an upper chest door 54. The upper chest door 54 includes a locking mechanism 55. The chest door 54 includes a user accessible opening 56 therethrough. The opening 56 is used for passing currency or other items between a customer and the devices located inside the upper chest 46. When the upper chest door 54 is in the closed position, then at least an end portion of the cash presenter 50 extends into the opening 56. Again, the cash presenter 50 can be used to present a stack of currency notes to a machine user through the opening 56.

In an exemplary machine embodiment, a dual function presenter can be used in conjunction with the opening 56 to both present items (e.g., cash) to machine users and receive items (e.g., cash, checks, deposits, etc.) from machine users. In other embodiments the automated banking machine can include other and/or additional features and devices (e.g., a check acceptor, etc.). For example, the automated banking machine can include a currency acceptor of the type discussed in the disclosure of U.S. Pat. No. 7,433,844, which is herein incorporated by reference in its entirety. The machine can be a cash recycling type of automated banking machine, such as discussed in the disclosures of U.S. Pat. Nos. 6,164,638 and 6,290,070, which are herein incorporated by reference in their entirety. The machine can operate in a manner discussed in the disclosure of U.S. Pat. No. 7,567,924, which is herein incorporated by reference in its entirety.

A gate 57 operates to block and unblock user access to the opening 56. As the currency notes are moved through operation of the cash presenter 50 toward the opening 56, the controller 33 operates a suitable actuating device to open the gate 57 so as to enable the stack of notes to pass outward through the opening 56. As a result, the presented stack can then be manually accessed by the user. After a user is sensed as having removed the stack from the opening 56, then the controller can cause the gate 57 to be closed so as to minimize the risk of tampering with the machine interior. The gate can operate in a manner discussed in the disclosure of U.S. Pat. No. 7,523,857, which is herein incorporated by reference in its entirety.

A front fascia 72 covers the lower chest door 52 and the upper chest door 54, except for the area of the opening 56. The front fascia 72 can be in the form of a hinged door that is equipped with a locking mechanism 82. The front fascia door 72 includes a door opening (slot) 71 that is aligned with the chest opening 56. An uppermost portion 73 of the fascia door 72 is located above (higher than) the opening 56. The fascia door 72 is mounted to the lower chest 44. The fascia door 72 prevents user access to the locking mechanisms 53 and 55. However, the fascia door opening 71 allows user access to cash presented at the user opening 56. The fascia door 72 also provides a more attractive appearance to the machine 10.

The front fascia 72 includes a front face 74 and first 76 and second 78 side extensions. When the machine 10 is viewed from the front (see FIG. 1), the front fascia 72 covers the lower chest 44 from side to side. The fascia door 72 is movable between a closed (covering) position (as illustrated in FIG. 1) and an open position. The interior of the lower chest 44 can be manually accessed for servicing when the fascia door 72 is in the open position.

Referring again to FIG. 3, the machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices and activities within the machine.

The machine 10 further includes a plurality of actuators schematically indicated 60 and 62. The actuators may comprise a plurality of devices such as motors, solenoids, cylinders, rotary actuators, and other types of devices that are operated responsive to the processor 33. It should be understood that numerous components within the machine are operated by actuators positioned in operative connection therewith. Actuators 60 and 62 are shown to schematically represent such actuators in the machine and to facilitate understanding.

The machine 10 further comprises at least one currency dispenser mechanism 64 housed in the secure area 42 of the lower chest 44. The currency dispensing mechanism 64 is operative responsive to the processor 33 to pick currency sheets (notes) from a stack of sheets 66 housed in one or more canisters 68. A canisters 68 may be alternatively referred to herein as a currency cassette. The picked currency sheets can be arranged by the currency stacker mechanism 70 for presentation through the delivery mechanism 50 to the opening 56.

As shown in FIG. 2, the machine further includes a rollout tray 80. The rollout tray 80 is movably mounted in supporting connection with slides 84. The slides 84 enable movement of the rollout tray 80 between the extended position shown in FIG. 2 and a retracted position within the interior area 20 of the top housing 12, as shown in FIG. 3. The rollout tray 80 may be similar to that shown in U.S. Pat. No. 6,082,616, the disclosure of which is herein incorporated by reference in its entirety.

The rollout tray 80 can have several upper banking machine components supported thereon, including the card reader 24, the input keys 26, a display 28, the receipt printer 30, and other components as appropriate for the particular machine.

The exemplary machine 10 further includes an upper fascia 86 that is in supporting connection with the rollout tray 80. The upper fascia 86 can include user interface openings, such as a card entry slot 88, through which a customer operating the machine 10 may insert a credit, debit, or other card. The upper fascia 86 can also include a receipt delivery slot 90 through which printed transactions receipts may be delivered to the customer. The rollout tray 80 moveably supports the upper fascia 86 relative to the top housing 12 so that the upper fascia 86 is movable between a first position covering the front opening 22 and a second position in which the upper fascia is disposed from the front opening 22.

As illustrated in FIG. 1, in an operative condition of the machine 10, the rollout tray 80 is retracted into the interior area 20 of the upper housing 12. Also in the operative condition the upper fascia 86 is positioned to close front opening 22 and provide an attractive appearance for the machine 10, while allowing a customer to input information and receive outputs from the machine.

In an exemplary embodiment, the upper fascia 86 is formed of a plastic material and the top housing 12 is formed of sheet metal. Alternately, the upper fascia and the top housing may include resilient materials to provide for their engagement and sealing in the closed position. However, other materials may be chosen, and these approaches are exemplary.

Figure 4:
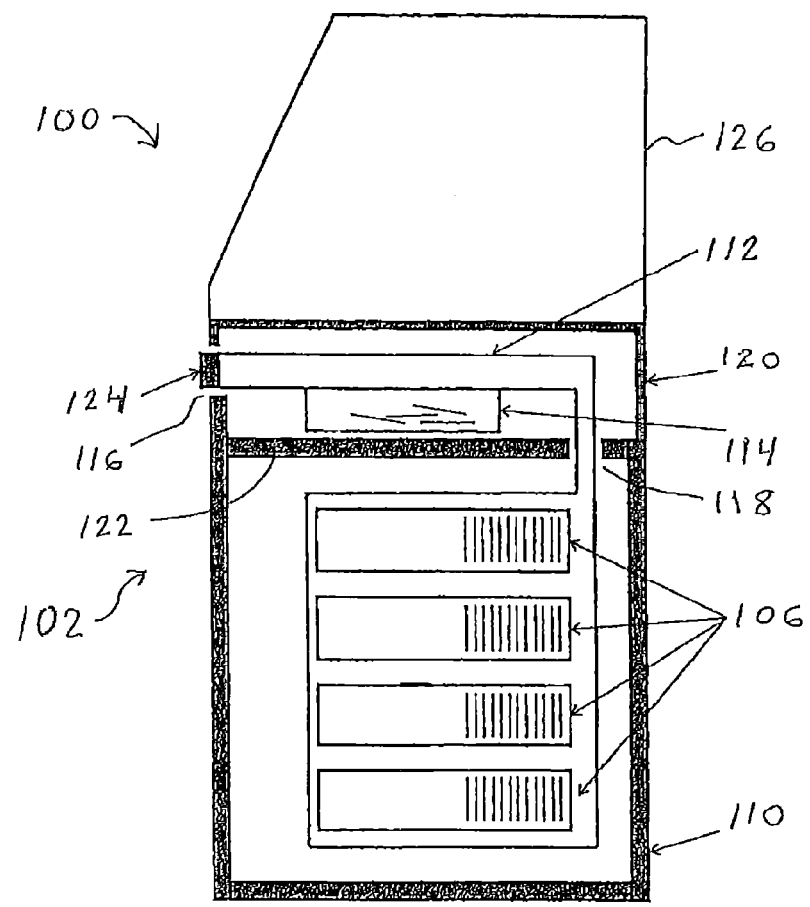
FIG. 4 shows another exemplary embodiment of an automated banking machine with a partitioned vault.

FIG. 4 shows another exemplary embodiment of an automated banking machine. The machine 100 includes a segmented secure enclosure 102. In this embodiment the secure enclosure 102 comprises a double (split) vault. The lower section 110 of the vault stores currency cassettes 106 that contain cash. The upper section 120 of the vault includes an item presenter 112, a currency rejection cassette 114, and a user opening 116. The machine can have cassettes of the type discussed in the disclosures of U.S. Pat. Nos. 7,780,073 and 8,052,044, which are herein incorporated by reference in their entirety.

A cash transport interface opening 118 (e.g., a slot) passes through an interior wall 122 that divides the two sections 110, 120. The wall 122 can horizontally extend across the entire width of the vault 102. The machine 100 also include a top housing 126, which can house input and output devices in a manner as previously discussed.

In some embodiments the interior wall 122 can be a single common wall that is shared by both vault sections 110, 120. The wall 122 can be part of a unitary vault that integrally connects the sections. For example, a concrete vault 102 may be constructed by having both sections 110, 120 be poured at substantially the same time to form a single unitary vault structure.

In another embodiment the wall 122 may be part of only one of the sections 110, 120. For example, the wall 122 can be a top wall of the lower section 110, where the upper section 120 does not have a bottom wall. Instead, the upper section 120 rests on, is supported by, and is fastened to the lower section's top wall.

In other embodiments the interior wall 122 can be formed of plural distinct walls. For example, the vault sections 110, 120 may be separately formed, where the lower section 110 has its own top wall and the upper section 120 has its own bottom wall. The lower section's top wall and the upper section's bottom wall can be connected and/or fastened together in constructing the vault. Thus, the combined top wall and bottom wall would form such an interior wall.

The presenter 112 is operable to present to a machine user, items through the user opening 116. For example, the presenter may present cash to a user during a cash dispense transaction. In an exemplary embodiment a dual function presenter is also operable to receive items (e.g., cash) from a machine user that are provided through the user opening 116.

In comparison to the structure of the lower section 110, certain structure of the upper section 120 is made purposely less robust (weaker in structural strength) to offer less resistance to an explosion. For example, the upper wall of the upper section 120 may be thinner than the walls that define the lower section 110. Alternatively, the upper section walls may be made of a different (weaker) material. Also, the upper section 120 may have at least one wall with a predetermined area that is intentionally made weaker (e.g., a different material or a thinned section) relative to the lower section walls. The exemplary arrangements specifically cause upper section structure to have a lower resistance to explosions. That is, the upper section 120 is deliberately arranged to act as a sacrificial chest in order to protect the integrity of the secure lower section structure.

As a result of the predetermined differences in structural properties between the vault sections 110 and 120, the upper section 120 is structurally configured to function like a pressure relief valve to reduce potential damage to the lower section 110. Thus, because of the vault's force dispersion structure, explosives inserted through the user accessible opening of the upper section 120 do not have the ability to cause the lower section 110 to be sufficiently breached, especially breached in a manner that creates a large enough opening to allow a criminal to access (through the opening) the cash in the lower section 110.

The structures of the presenter 112 and the rejection cassette 114 in the upper compartment 120 are specifically positioned to prevent an explosive item from being placed adjacent to the transport slot 118. That is, the rejection cassette 114 can be placed into the upper section 120 at a particular location to help block the path that extends from the user opening 116 to the slot 118. However, in other embodiments the rejection cassette 114 may be situated in the lower section 110.

In an exemplary embodiment the vault configuration and device positioning therein are diagrammed in detail so that an explosion acts to further deter access to the stored cash. For example, in an exemplary embodiment an explosive blast is used to deform the lower section's top (blast proof) wall in a manner that pinches the slot. As a result, the slot becomes an even smaller opening. Furthermore, the positioning of vault components (e.g., rollers) is planned so that the blast also causes these components to get jammed in an area adjacent to the slot. Thus, even if a criminal was somehow able to access the slot after the blast, the criminal would still be prevented from using the slot to gain access to the interior of the vault's lower section.

An exemplary vault can have several separated vault sections, including more than two distinct areas. Some sections of a multi-sectioned vault can have one or more user openings that are accessible to people. Other sections of the same vault can be absent (be without) any user accessible opening. These other sections can be used to store valuables such as currency. Again, the vault sections that have an opening (e.g., a user accessible opening) in which an explosive can be placed are kept isolated from the other vault sections in which cash is stored.

Figure 5:
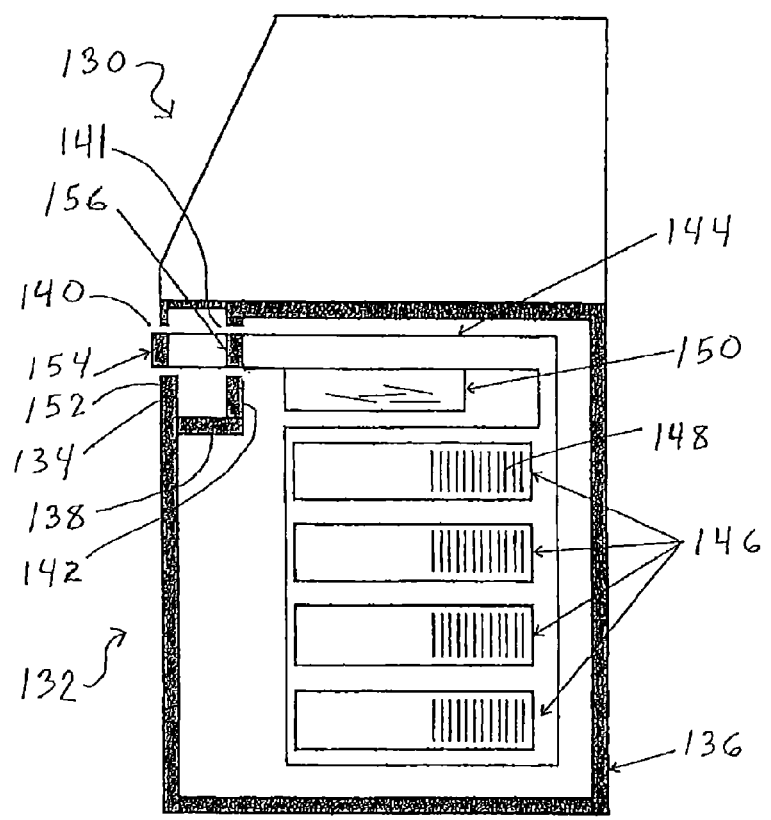
FIG. 5 shows an automated banking machine with a different vault configuration.

FIG. 5 shows a further exemplary embodiment of an automated banking machine 130 that comprises a multi-segmented vault 132. The machine 130 has machine components that are similar to those already shown in FIG. 4. However, the vault 132 is divided differently.

The vault 132 has distinct sections 134, 136 that are separated by commonly shared walls 138, 142. The wall 138 extends in a horizontal direction, whereas the wall 142 extends in a vertical direction. One (smaller) vault section 134 is placed at an upper inner side of the vault 132. The smaller vault section 134 includes a user accessible opening 140. A minor portion of a sheet presenter 144 extends into the smaller vault section 134. That is, at least a portion of the presenter 144 is located in a distinctly separated (smaller) section 134 of the vault 132 which does not include the currency dispenser, currency cassettes 146, stored cash 148, etc. A rejection cassette 150 and the remainder of the presenter 144 are located in the cash-storing larger vault section 136.

The machine 130 includes two access control gates 154, 156 (or shutters). The first gate 154 controls user access to the exterior opening 140 in the front wall 152. The second gate 156 controls access through the interior passage 141 in the vertical wall 142. The second gate 156 helps to isolate the machine area 136 which stores cash from the machine area 140 which is accessible to users. The second gate also acts as a blocking deterrent that prevents an explosive from being placed in (or through) the passage 141. The second gate 156 can also assist in confining the effects of an explosive device that is detonated in the smaller vault section 134. The structure of the second gate 156 can comprise higher strength (or grade of) material relative to the structure of the first gate 154.

The second gate 456 does not have to completely block the entire entrance to the interior passage 141, but only prevent an undesired object from moving past the gate 456. For example, the second gate 456 may have spaced (slotted) fingers that move closely between (or against) belts of the presenter 144. Thus, the gate 456 when open can allow presenter operation, yet when closed can prevent an object from being push (parallel and next to the belts) through the passage 141. The gate when closed may prevent movement of a sheet through the passage or even prevent movement of any presenter belt.

The common walls 138, 142 can be of a higher strength than the front wall 152 (and all other vault walls). The common walls 138, 142 can function as blast resistant structure. Thus, the pressure effects caused by an inserted explosive can be confined to an area that does not include the larger vault section 136. That is, the protective structural configuration of the vault 132 causes an explosive force to be directed outwardly away from the larger vault section 136.

Figure 6:
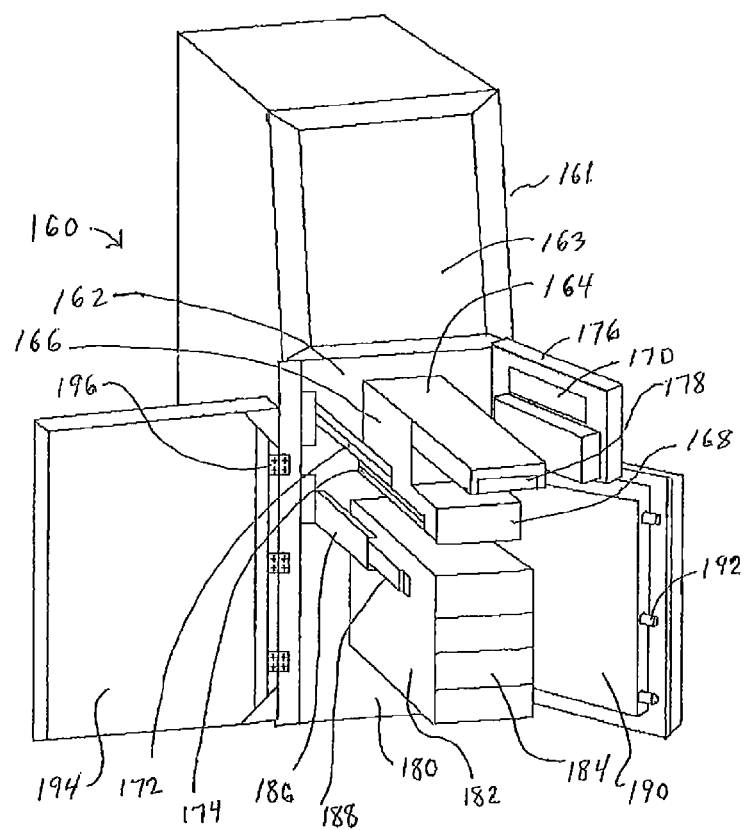
FIG. 6 shows an automated banking machine including respective open vault doors for respective vault areas.

FIG. 6 shows another exemplary embodiment of an automated banking machine with a sectioned vault arrangement. The machine 160 includes an upper area and a lower secure area. The upper area includes a top housing 161 and the components associated therewith, such as a display 163. The lower secure area has respective vault doors for respective vault areas.

An upper vault section 162 is configured to house several upper components, including a cash presenter 164, a stacker 166, and a rejection bin 168, which is alternatively referred to as a divert cassette. The upper components are removably supported by an upper slide arrangement. The upper slide arrangement includes overlapping slide arms 172, 174. The upper slide arrangement allows the upper components to be moved (slid) into and out of the upper vault area 162. The slide arms can include brackets. The brackets can be telescopically arranged or mounted, where one bracket is slidable in the other. One or more of the brackets may also have rollers that can roll in guides (tracks) of the other slide bracket. Slides may be of the type disclosed in U.S. application Ser. No. 13/419,932 filed Mar. 14, 2012, which is herein incorporated by reference in its entirety.

A lockable upper door 176 is movable to open and close the upper vault section 162. The upper door includes a user accessible opening 170, such as a slot through which a stack of cash can pass. When the cash presenter 164 is operatively positioned in the upper vault section 162 and the upper door 176 is closed, then the presenter's outlet opening 178 is substantially aligned with the door's user accessible opening 170. Thus, cash can be presented by the presenter through the door opening 170 to a machine user.

A lower vault section 180 is configured to house cash-holding components, including a cash dispenser module 182 with currency cassettes 184. The cash dispenser 182 is removably supported by a lower slide arrangement. The lower slide arrangement includes overlapping slide arms 186, 188. The cash dispenser module and cash handling system can operate in a manner discussed in the disclosure of U.S. Pat. No. 7,165,767, which is herein incorporated by reference in its entirety.

The lower slide arrangement can also include a lower support module on which the cash dispenser bottom can rest when in the vault. This lower support module can include slide rollers. The bottom of the cash dispenser module can slide along the rollers of the lower support module. The lower slide arrangement (with slide arms and lower support slide rollers) allows the cash dispenser to be easily moved (slid) into and out of the lower vault area.

A lockable lower door 190 is movable to open and close the lower vault section 180. The lower door 190 includes movable (slidable) locking bolts 192. The upper and lower vault sections 162, 180 of the vault (safe) can include bolt works, hinges, materials, and construction of the type discussed in the disclosures of U.S. Pat. Nos. 7,159,767, 6,907,830, and 5,970,890, which are herein incorporated by reference in their entirety.

The machine 160 also includes a lockable fascia door 194 which can be mounted by hinges 196. When both the lower door 190 and the upper door 176 are closed, then the fascia door 194 can be closed to a position that covers (overlaps) the lower door and the portion of the upper door which does not include the user accessible opening 170. The fascia door 194 limits access to the upper 176 and lower 190 vault doors. The fascia door can also provide an attractive appearance that is in visual accordance with the other outer surfaces of the machine, including the machine housing.

In other embodiments the fascia door 194 can be vertically extended to simultaneous fully cover both the closed lower door and the closed upper door. The extended fascia door would have a user accessible opening therethrough which corresponds in alignment with the upper door's user accessible opening 170. As a result, cash could be accessed through the extended fascia door's opening by a machine user.

Figure 7:
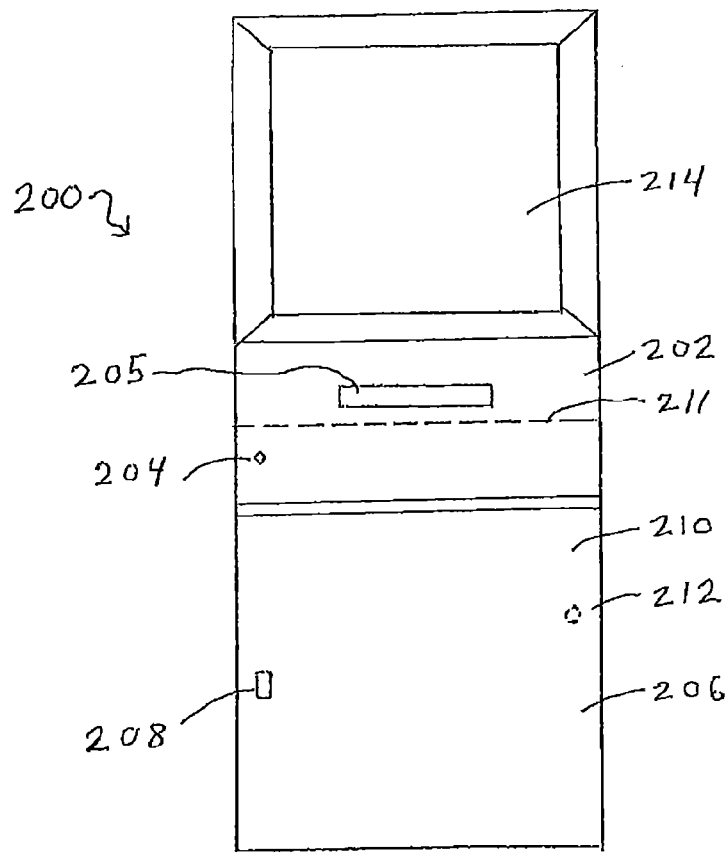
FIG. 7 shows an automated banking machine including respective closed doors covering vault areas.

FIG. 7 shows a front view of a further exemplary embodiment of an automated banking machine. The machine 200 includes a vault that is similar to the three-door sectioned-vault shown in FIG. 6. However, in FIG. 7 the doors are shown in their closed positions. FIG. 7 shows an upper vault section door 202 with a lock 204, a lower vault section door 206 with a lock 208, and the fascia door (or panel) 210 with a lock 212. For clarity the fascia door's upper (or top) edge 211 and the fascia door lock 212 have been shown in broken (dashed) lines. As can be seen, in the embodiment of FIG. 7, the fascia door 210 covers substantially all of the lower vault door 206 but only a portion of the upper vault door 202. Thus, the user access opening 205 in the front wall of the upper vault door 202 is not blocked by the fascia door 210. In contrast, the fascia door 72 in the embodiment shown in FIG. 3 additionally includes an upper door portion 73 which covers an area of the upper vault door 54 located above the user access opening 56. A user display 214 is also shown.

Figure 8:
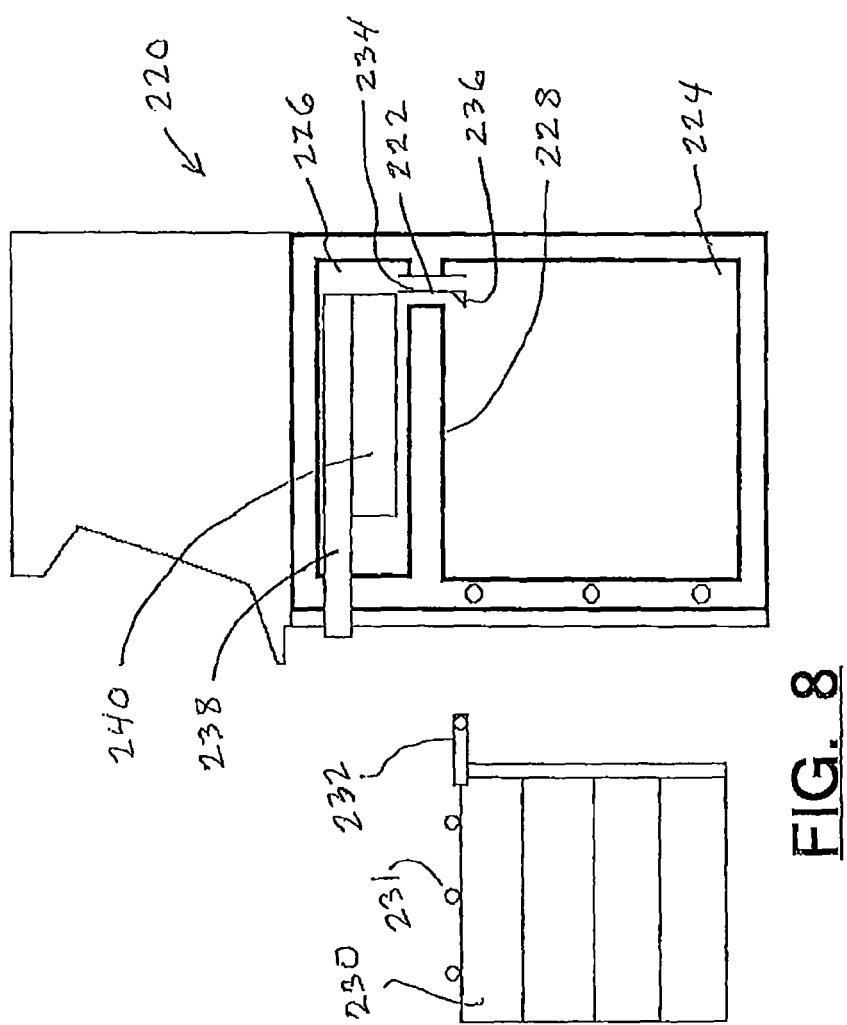
FIGS. 8-10 show different stages of installing an exemplary sheet transport path between a lower vault section and an upper vault section of an automated banking machine.
Figure 10:
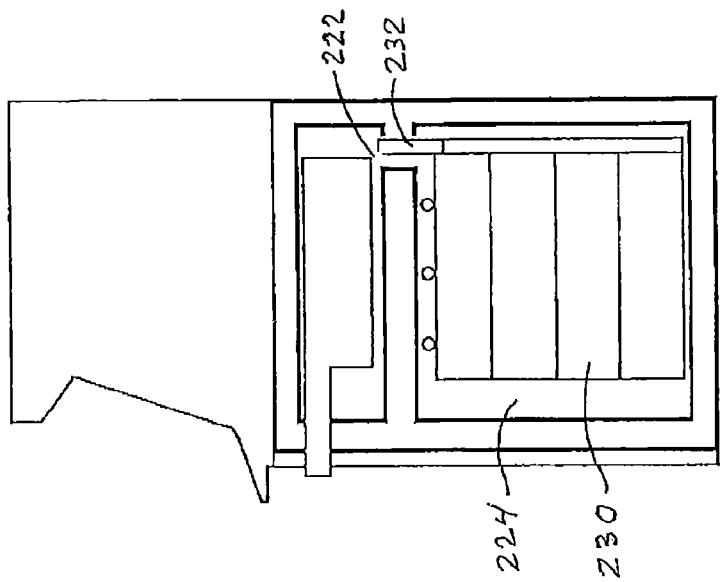
Figure 9:
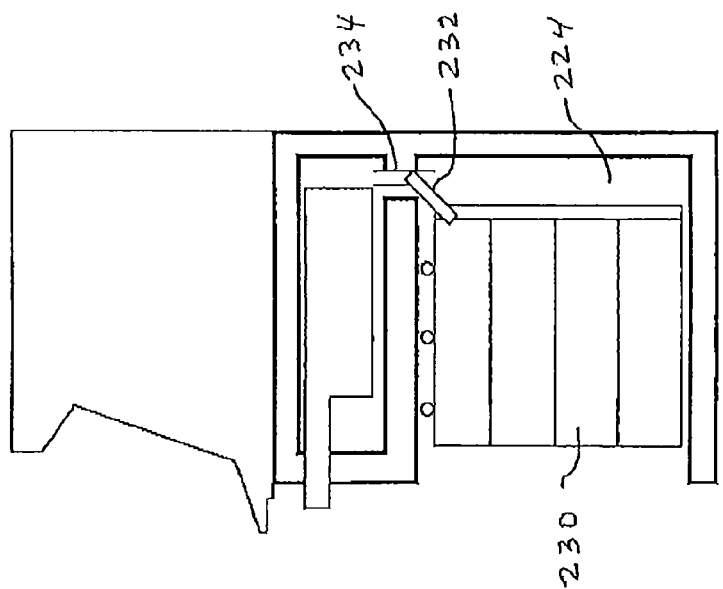

An exemplary example of installing a cash dispenser module into an exemplary sectioned-vault automated banking machine is shown in FIGS. 8-10. The machine 220 can have a vault arrangement (and components) similar to that shown in FIG. 6. The machine 220 during operation includes an exemplary sheet (cash) transport mechanism that is operable to move cash inside the vault areas.

The FIGS. 8-10 also show different stages of an exemplary procedure for causing an intermediate section of the vault's transport mechanism to be automatically positioned in the shared opening 222 between vertically spaced secure areas of the vault. The secure areas in FIG. 8 include a lower chest 224 and an upper chest 226. The feature of a shared opening 222 has already been discussed. For example, note the transport opening 92 shown in FIG. 3 and the transport slot 118 shown in FIG. 4.

In the exemplary embodiment, the cash dispenser module 230 includes the movable transport section 232. The transport section 232 can be removably attached to the dispenser module 230. The transport section 232 can pivot (rotate) relative to the module. In an exemplary embodiment the transport section 232 is spring loaded toward a downward position. The transport section 232 may alternatively be referred to herein as a transport swing arm.

Extending into the opening 222 is a guide structure 234, which can also include portions (gears, belts, etc.) of the vault transport mechanism. Different embodiments allow for differently configured guides to be fastened in different manners. For example, a guide may be attached (fastened, bolted, welded, etc.) to the vault at the lower chest, at the upper chest, or at both chests. In the embodiment shown, the guide 234 is attached to a vault dividing plate 228 which includes the opening 222. The guide 234 can include a cam, ramp, taper, or other angled structure which the swing arm can movingly engage.

In an alternative embodiment a guide can be removably attached to a cash presenter, where the guide gets installed as the presenter is moved into position relative to the transfer slot. The guide can be spring biased downwardly, where upon moving engagement with a fixed cam the guide is moved into the transfer slot.

As previously discussed, the cash dispenser 230 can be movably supported by a slide arrangement which includes slide arms. The cash dispenser 230 can also be supported by a lower support module (with slide rollers). Rollers 231 which are usable in inserting the cash dispenser 230 are also shown.

Sliding insertion of the cash dispenser 230 into the lower chest 224 causes the swing arm 232 to begin pivoting upwards upon engaging a ramp portion 236 of the guide 234. The further the cash dispenser 230 is moved into the chest 224, the further the arm 232 swings upward. When the cash dispenser is fully inserted at its operative position, then the swing arm 232 is fully inserted into the opening 222. In an exemplary embodiment the cash dispenser module insertion causes the swing arm 232 to pivot substantially ninety degrees.

FIG. 8 shows the cash dispenser module 230 located outside of the lower chest 224. FIG. 9 shows the cash dispenser module 230 inserted part way into the lower chest 224. As can be seen, the moving engagement of the swing arm 232 against the guide 234 causes the arm 232 to pivot upwardly. FIG. 10 shows the cash dispenser module 230 fully inserted into its operating position in the lower chest 224. As can be seen, the transport arm 232 extends into (and through) the opening 222.

In an exemplary embodiment, when the transport arm 232 is in its fully inserted position (FIG. 10) then it is operatively engaged with a portion of the upper transport mechanism section located in the upper chest 226. Thus, the transport arm 232 connects the upper portion of the transport mechanism to the lower portion of the transport mechanism.

As previously discussed, the upper portion of the transport mechanism can include the cash presenter 238, the note stacker 240, a divert bin (reject cassette), intermediate (linking) transport structure, etc. The upper transport portion can move currency notes in the upper chest. As previously discussed, the lower portion of the transport mechanism can include the cash dispenser module, intermediate transport structure, etc. The lower transport portion can move currency notes in the lower chest. The transport arm 232 bridges the gap between the upper and lower transport portions.

Figure 11:
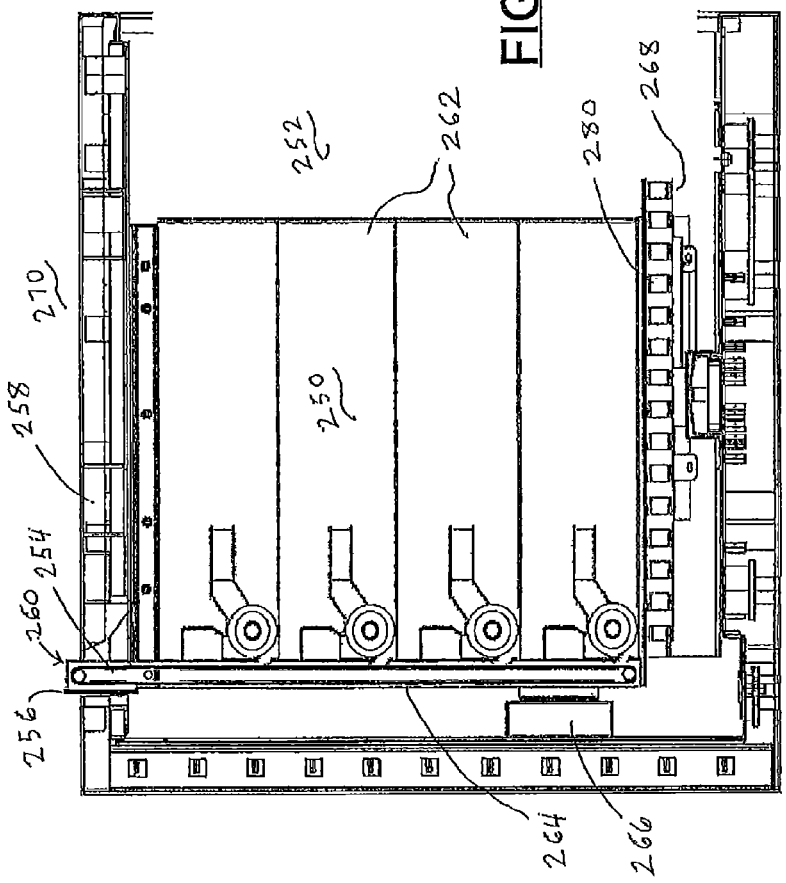
FIGS. 11-13 show different views of an exemplary sheet transfer arrangement in a vault area of an automated banking machine.
Figure 12:
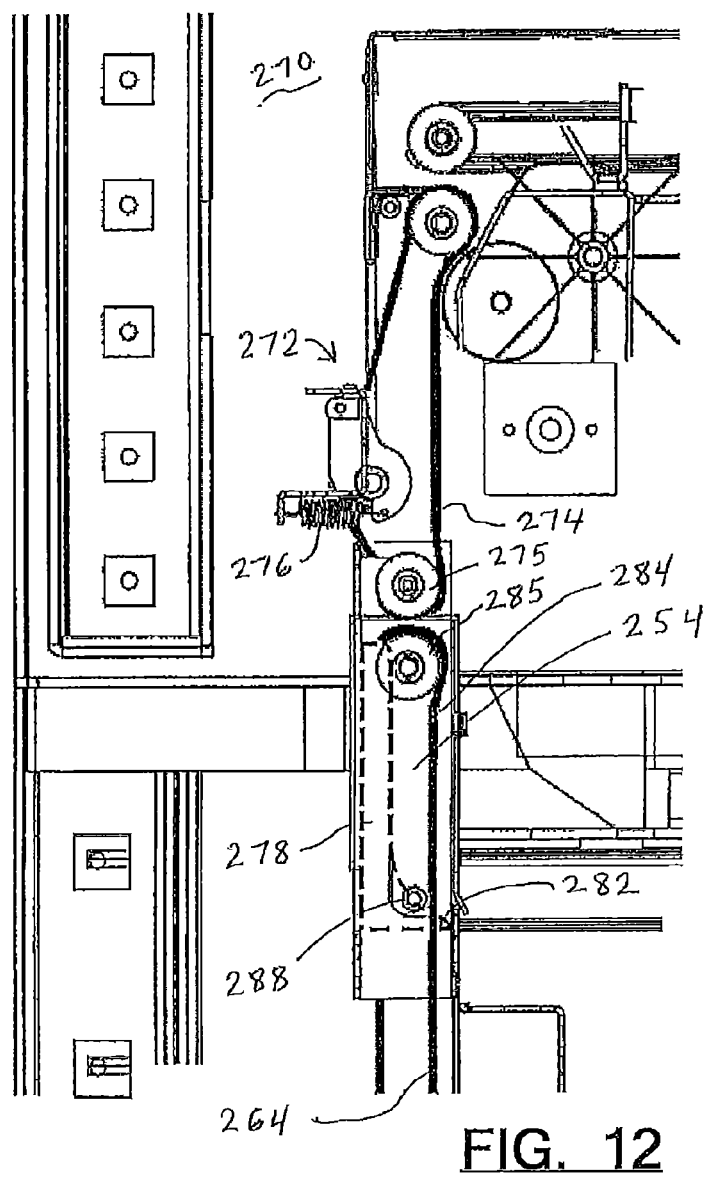
Figure 13:
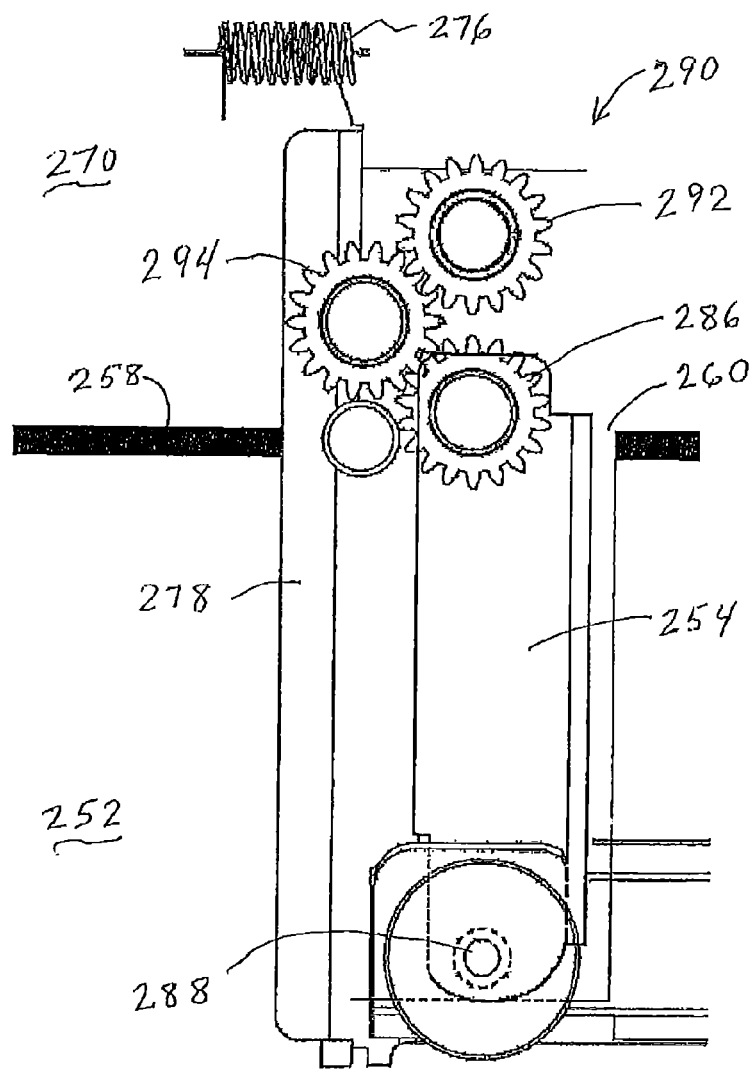

FIGS. 11-13 show an exemplary embodiment of an automated banking machine. FIG. 11 shows a cash dispenser module 250 fully inserted into its operating position in a lower chest 252 of the machine. A transport swing arm 254 and a positioning guide 256 are extending through a sheet transfer opening 260 that links the lower chest 252 to an upper chest 270. The vault chests 252, 270 are separated by a vault partitioning wall 258 that includes the opening 260. Also shown are currency cassettes 262, a belt 264 of the lower transport section, an alignment stop 266 which the cash dispenser can abut, and a lower support module 268 with rotatable slide rollers (or ball bearings) 280 that are usable for sliding the cash dispenser 250 into the machine.

FIG. 12 shows a fully positioned transport swing arm 254 adjacent to a portion 272 of an upper transport mechanism situated in the upper chest 270. The lower transport belt 264 is substantially aligned with an upper transport belt 274. The alignment of the belts 264, 274 allows a (currency note) sheet to be moved along the belts from one chest section (lower or upper) to the other. Again, the transport swing arm 254 bridges the gap between the upper and lower transport portions.

Also shown in FIG. 12 are a belt tensioning device 276 and a guide 278 for the swing arm 254. The guide 278 (which is shown in broken lines) has an angled cam 282. As previously discussed, the swing arm 254 abuts the cam 282 to start swinging in an upwardly direction. As the cash dispenser 250 is being inserted, the swing arm 254 follows (swings) along the curve of the cam 282 to pivot about a pivot axis 288 from a substantially horizontal orientation to a substantially vertical orientation. During the cash dispenser insertion, the previously noted spring-loaded downward-acting force (toward the horizontal orientation) on the swing arm 254 is overcome.

In an exemplary embodiment, the swing arm 254 carries an upper portion 284 of the lower transport belt 264. Note FIG. 11. This belt portion 284 pivots with the swing arm 254. Thus, the lower transport belt 264 is bent approximately ninety degrees when the swing arm 254 is in its substantially horizontal orientation. As the swing arm 254 straightens into its substantially vertical orientation so does the upper portion 284 of the belt 264. A swing arm roller 285 helps support the lower transport belt portion 284, whereas an adjacent roller 275 helps support the upper transport belt 274.

FIG. 13 shows an intermediate gear arrangement 290 located adjacent to the wall slot 260. At least one toothed gear 286 carried by the swing arm 254 is in operative connection with at least one toothed gear 292 of the upper transport section of the transport mechanism. The upper portion intermediate gears 292 can be spring loaded in a direction toward engagement with the toothed gear 286.

In an exemplary embodiment the gears 292, 294 are both part of an upper transport located in the upper chest 270. In an alternative embodiment the gear 292 is part of the upper transport, whereas the gear 294 is part of the guide 278. That is, a gear 286 of the swing arm 254 engages a gear 294 of the guide which is in turn engaged with a gear 292 of the upper chest transport.

The upper transport section includes at least one transport drive motor which is able to impart drive to the at least one toothed gear 292 of the upper portion. For example, the cash presenter can include a drive motor.

The intermediate gear arrangement 290 operatively connects an upper portion transport drive (e.g., the presenter drive) in the upper chest 270 to the lower portion transport in the lower chest 252. As a result of the upper chest to lower chest drive connection, the transport portion located in the lower chest 252 can be driven by the transport drive portion located in the upper chest 270. That is, the exemplary arrangement allows for use of a drive motor located in one chest (e.g., the upper chest 270) to drive a transport mechanism located in the other chest (e.g., the lower chest 252). For example, a motor of the cash presenter can be used to drive all of the belts in the lower chest 252, including the belts associated with the cash dispenser 250.

The intermediate gears 286, 292, 294 can be part of a transmission arrangement which is intentionally located near the slot 260 to further hinder criminal access to the slot. Also shown in FIG. 13 is the belt tensioner 276 and the pivot point (axis) 288 for the swing arm 254.

Figure 14:
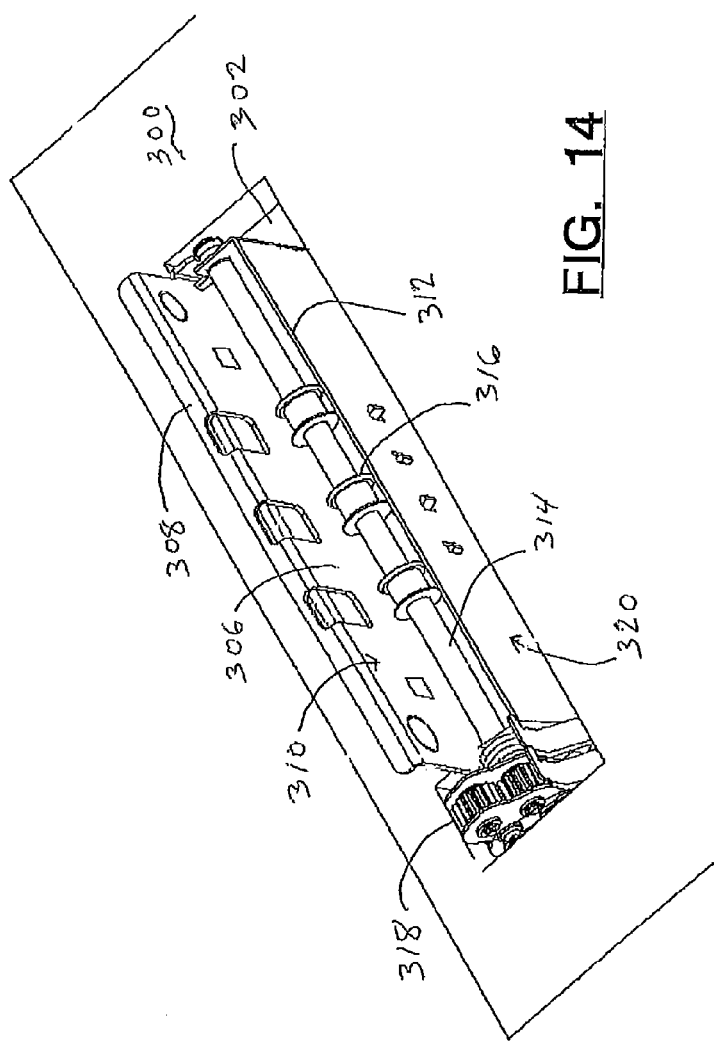
FIG. 14 shows a sheet transfer slot in a vault wall, and sheet handling components adjacent the slot.

FIG. 14 shows a view looking downward toward a slot 302 in a vault dividing wall 300. The shown structure includes a guide 310 with a substantially (straight) flat portion 306 and an angled portion 308, which protrudes outward from the flat portion. The guide's angled portion 308 can be removably connected (attached) to a part of the upper chest's transport mechanism. For example, the attaching portion 308 is configured (shaped) to correspondingly fit into a receiving slot of the upper transport mechanism. The guide 310 can act as a stop for the upper transport mechanism. That is, the guide 310 can help direct (guide) the upper transport mechanism into operative alignment relative to the wall slot 302 (and an installed swing arm), such as during insertion of the sheet presenter module into the upper chest. The guide piece 310 can include belts, rollers, ribs, or other sheet transport structure which assist the swing arm in the transport of sheets between the upper and lower chests.

FIG. 14 also shows a swing arm 320. The swing arm 320 includes a straight wall portion 312 that functions as a sheet path. The swing arm 320 also includes a rotatable rod 314 having sheet guiding roller segments 316 thereon. The rollers 316 help direct (guide) a sheet into and along the sheet path 312. Also shown is a toothed gear arrangement 318 of the swing arm's sheet transport portion. Connection of the gear 318 with gears in the upper chest has previously been discussed. The gear arrangement 318 is able to be driven by the upper transport mechanism (located in the upper chest). As previously discussed, the driven gear arrangement 318 can be used to impart drive to the entire lower transport mechanism (located in the lower chest).

Exemplary embodiments previously discussed provide for an exemplary sheet transfer relationship between the lower chest components (e.g., a cash dispenser) and the upper chest components (e.g., a cash presenter) which allows for the components to be tested together outside their operating position. That is, an exemplary embodiment enables an entire vault's sheet transport mechanism to be tested away from its normal operating position in the vault. The testing does not involve use of the vault's sheet transfer slot, which during machine operation enables transport of sheets from one vault section (e.g., lower chest) to another vault section (e.g., upper chest). It follows that the (fixed) guide associated with the slot is also not used in the testing. However, the exemplary sheet transfer relationship allows for use of a portable (test) piece in place of the guide. The portable piece is used like a guide in order to bridge the transfer (distance) gap between the lower transport mechanism and upper transport mechanism.

FIG. 15 shows a portable piece 330 that can be used for testing of the sheet transport devices. That is, the exemplary portable piece 330 allows testing of sheet transfer between the cash dispenser and the cash presenter (and vice versa) to occur without these components being in their operative position in the machine. For example, sheet transport testing can be carried out while the machine components (e.g., cash dispenser and cash presenter) are in their outer slide positions shown in FIG. 6. Again, the test piece 330 can be used to act as a guide to which the lower transport's swing arm can abut to be swung upwards into the upper transport. As previously discussed, FIG. 8 shows a cash dispenser module 230 located entirely out of the machine. Likewise, the sheet presenter 238 (of FIG. 8) can also be moved (slid) entirely out of the machine. Thus, the portable piece 330 can be used as a replacement for the guide 222 to test transporting sheets between the cash dispenser 230 and the cash presenter 238 while they are both located (and supported) outside of the machine. Thus, testing whether sheets will be properly moved through a vault wall opening (between upper and lower chests) can be conducted (and verified) before the vault components (e.g., cash dispenser and cash presenter) are initially placed (or reinserted) into the machine.

The portable test piece 330 of FIG. 15 includes upper engagement structure 332 that is configured to removably fasten to corresponding engagement structure of an upper chest component (e.g., a stacker, presenter, reject bin, etc.). For example, engagement structure of the test piece can include a male portion 332 (e.g., projections, tabs, hooks, screws, bolts, etc.) that can fit into a corresponding female portion (e.g., openings, slots, etc.) of an upper chest component. In some embodiments the upper engagement structure 332 can be engaged with a projection extending from the vault wall that has the sheet transfer slot. In alternative embodiments the test piece can have the female portion. Different test piece embodiments can include different types of fasteners, including plastic snap-in place fastening, velcro hooks fastening, etc.

In an exemplary embodiment at least two separated points of fastening occur between the test piece and the upper chest component to limit or prevent movement of the test piece. In other embodiments the portable test piece also has structure that allows its lower portion to be removably fastened to a lower chest component (e.g., upper support structure for a cash dispenser module).

Similar to previously discussed guides, the test piece 330 can have a curved (cam) contact edge 334 (or ramp) that causes an abutting swing arm to be moved in an upward direction. After the test piece has been installed, the swing arm (of the cash dispenser) can be moved relative to the test piece to cause the swing arm to create a connecting sheet transfer path between the cash dispenser and the upper chest component. Once the swing arm is properly positioned, then the sheet (cash) transfer testing can begin.

FIGS. 16-19 shows other embodiments of a portable test piece. In FIG. 16 the test piece 340 includes a curved ramp (or foot) 336 and fastening hooks 338. In FIG. 17 the metal test piece 342 includes cut out spring fingers 344, 346 and a flat ramp 348. FIG. 18 shows an upper portion 350 of a test piece which includes an opening 352 sized to receive a corresponding engagement hook therein.

Figure 19:
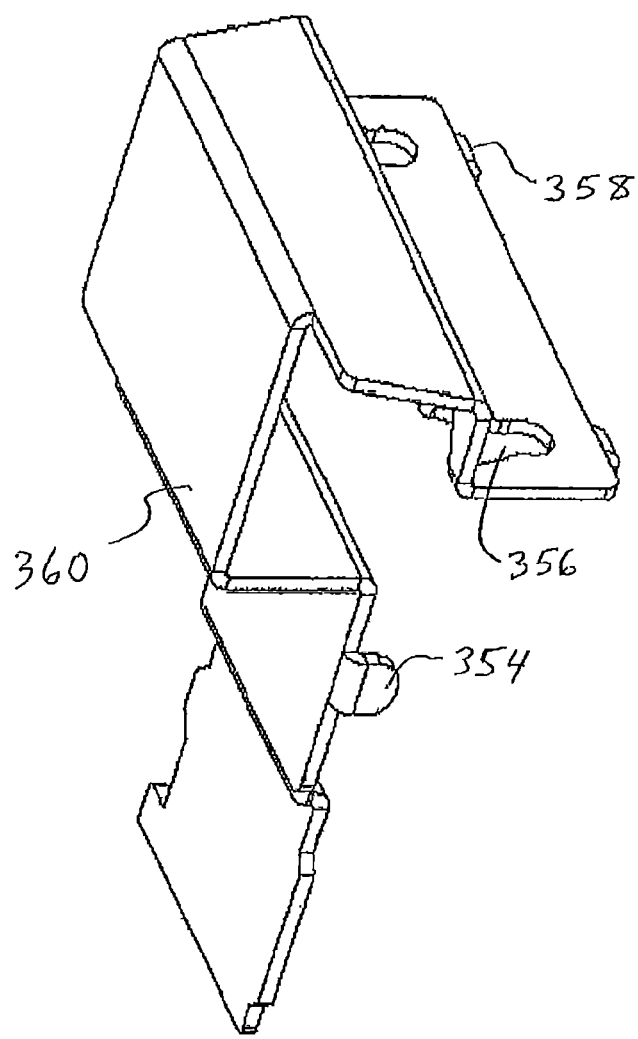

FIG. 19 shows a test piece 360 which includes tabs 354, slots 356, and projections 358 for fastening (connecting) to structure of an upper chest component. The upper chest includes a support frame that helps support the upper chest components. A bottom portion of this support frame can include slide rollers or bearings. These upper chest components can be part of a module, where the module is installed by being pushed (slid) into position on the bottom portion of the support frame. As previously discussed, the lower chest likewise includes a support frame that helps support the dispenser module. This the lower chest support frame includes a top portion. The piece 360 is configured for use in locking the bottom portion (of the upper chest support frame) to the top portion (of the lower chest support frame).

In an exemplary embodiment of transporter testing, the piece 360 is installed (attached) before the dispenser module is pushed into position. The configuration of the piece 360 allows it to be manually installed without requiring use of any tools. The attachment and positioning of the test piece 360 is also configured to protect the transport swing arm from accidental damage. For example, the transport arm could somehow be locked up (or frozen) in its (spring-induced) horizontal orientation while the dispenser module is pushed into its test position. As a result, engagement of the transport arm against the test piece will not cause the arm to swing upward into its vertical orientation. Because of the configuration and manner in which the test piece is attached, the abutting force of a locked up transport arm against the test piece 360 will cause the piece to be automatically released from it attachment.

Furthermore, in an exemplary testing process the currency notes being transported through the gap only move in engagement with the transport arm. That is, because of the predetermined positioning of the test piece 360 relative to the location of the transport arm, during transporter testing the currency notes do not engage (nor touch) the test piece. Hence, the testing arrangement also helps to keep the currency notes from unnecessary wear. In some testing method embodiments a test piece need not guide the swing arm into its vertical orientation. Rather, the cash dispenser module can be raised vertically while the swing arm is already (fixed) in its vertical orientation. In such an embodiment the portable test piece does not need a ramp. However, the test piece (being connected to upper transport structure) can still provide stability to the transport path and help keep the swing arm aligned in its proper sheet transfer position. Also, in some embodiments the test piece (like a guide) may include transport components (e.g., a gear, ribs, etc.) that when used in combination with other transport components (e.g., a belt, guide path, rollers, etc.) in the swing arm form a complete sheet transfer mechanism at the gap between the separated upper and lower transfer mechanisms.

An exemplary automated banking machine is operable to cause financial transfers responsive at least in part to data read from data bearing records, such as user cards. The machine includes at least one data reader that is operable to read user data (e.g., card data) that is usable to identify a financial account. The machine includes a cash dispenser which includes at least one currency cassette. The machine also includes at least one display that is operable to provide visible outputs to users of the machine. The machine is associated with at least one processor that is in operative connection with the machine devices, including the at least one data reader, the cash dispenser, and the at least one display.

The machine is operable to allow a machine user to carry out a cash dispense transaction on a financial account responsive at least in part to computer-determined correspondence between user data read by the at least one reader device and authorized user data stored in at least one authorized user data store. The machine is further operable to cause the financial account to be assessed a value associated with the cash dispensed in the transaction.

The machine includes a physical structure comprising a safe (i.e., a vault). The safe includes a lower section and an upper section. The lower section is bounded by a lower section top wall, a lower section bottom wall, a lower section front wall, a lower section rear wall, and lower section side walls. The lower section top wall includes a slot extending therethrough. The lower section front wall is opposite the lower section rear wall.

The lower section houses at least one cash transport and the at least one currency cassette. The at least one cash transport is operable to transport cash removed from the at least one currency cassette through the slot. The at least one cash transport includes a transport member.

In an exemplary embodiment the transport member is movable between a substantially horizontal position and a substantially vertical position. The transport member is spring biased toward the substantially horizontal position. The transport member is configured to extend in alignment with the slot when in the substantially vertical position. The transport member is operable in the substantially vertical position to cause cash that is in engagement with the at least one cash transport to move in the slot.

The lower section is absent a user accessible opening. However, the lower section includes a lockable lower section door. The lower section door is mounted in supporting connection with one of the lower section front wall and the lower section rear wall. The lower section door in a closed position prevents service provider access to the at least one currency cassette. The lower section door in an open position allows service provider access to the at least one currency cassette.

The upper section of the safe is positioned above the lower section, and is operatively supported by the lower section. The upper section is bounded by an upper section top wall, an upper section front wall, an upper section rear wall, and upper section side walls. At least one of the upper section top wall, the upper section front wall, the upper section rear wall, and the upper section side walls is configured to be more susceptible to structural deformation by pressure force than the lower section top wall.

The upper section front wall is opposite the upper section rear wall, and includes a user accessible opening. Cash extending in the user accessible opening is accessible to a machine user.

The upper section houses a cash stacker that is operable to receive cash transferred from the at least one currency cassette through the slot. The cash stacker is operable to produce a stack of cash from received cash.

The upper section also houses a cash presenter which includes a gate. The cash presenter gate is positioned adjacent to the user accessible opening when the cash presenter is in an operational position. The gate is moveable between a closed position and an open position. With the gate in the open position, the cash presenter is operable to make accessible at the user accessible opening to an authorized machine user, a stack of cash produced by the cash stacker. With the gate in the open position, the cash presenter is also operable to retract from the user accessible opening, cash made accessible to an authorized machine user.

The presenter includes a drive (e.g., a motor). The presenter drive also drives the at least one cash transport that is housed in the lower section. Adjacent to the slot there is an intermediate gear that is spring loaded. The intermediate gear operatively connects the presenter drive to the at least one cash transport. The intermediate gear is a part of a transmission arrangement which is intentionally located near the slot to hinder slot access.

The upper section also houses at least one divert cassette. The at least one divert cassette is configured to receive cash that was diverted from being presented to a machine user. Diverted cash can include cash that was determined by the machine to be unacceptable, including suspect bills, counterfeit notes, etc. The at least one divert cassette is configured to also receive untaken cash that was retracted from the user accessible opening by the cash presenter.

The upper section includes a lockable upper section door. The upper section door is mounted in supporting connection with one of the upper section front wall and the upper section rear wall. The upper section door in a closed position prevents service provider access to the interior of the upper section. However, the upper section door in an open position allows service provider access to the interior of the upper section. Once the interior of the upper section is accessed, then both the presenter and the at least one divert cassette can also be accessed. The access enables a divert cassette to be emptied. The access also enables a person (e.g., a bank employee) to service the presenter, such as clearing jammed notes therein. As can be appreciated, the upper section door can give a person access to both the presenter and the at least one divert cassette, without giving the person access to the cash dispenser.

The upper section includes at least one slide. The at least one slide operatively supports the at least one divert cassette, the cash stacker, and the cash presenter. The at least one slide allows the cash presenter to be moved in operatively supported connection with the safe between an operational position and a service position. In an operational position, the cash presenter is located fully inside the upper section. In a service position, the cash presenter extends at least partly outside of the upper section.

The machine further includes a top housing. The top housing is positioned above the upper section, and is operatively supported by the upper section. The top housing operatively supports the at least one data reader. The top housing also operatively supports at least part of the at least one display.

In some embodiments the safe is a one-piece unitary structure. In other embodiments the safe can be constructed of different pieces. For example, metal plates may be fastened (e.g., welded) together to form a safe. Various materials may be used (combined) in constructing of the safe. Such materials can include steel reinforced concrete, sloped armor plating, energy absorbing materials or modules, fire retardant materials, etc. The energy absorbing modules can help reduce explosion pressure and pressure oscillations.

Thus, automated banking machines and systems of the exemplary embodiments may achieve one or more of the above stated objectives, eliminate difficulties encountered in the use of prior devices and systems, solve problems, and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries, and principles of the invention, the manner in which it is constructed and operated, and the advantages and useful results attained; the new and useful structures, devices, elements, arrangements, parts, combinations, systems, equipment, operations, methods, processes, and relationships are set forth in the appended claims.

We claim:

1. Apparatus comprising:
an automated banking machine operable to cause financial transfers responsive at least in part to data read from data bearing records,
wherein the machine includes at least one data reader,
wherein the at least one data reader is operable to read user data usable to identify a financial account,
wherein the machine includes a cash dispenser,
wherein the cash dispenser includes at least one currency cassette,
wherein the machine includes at least one display,
wherein the at least one display is operable to provide visible outputs to users of the machine,
wherein the machine is operable to allow a machine user to carry out a cash dispense transaction on a financial account responsive at least in part to computer-determined correspondence between user data read by the at least one reader device and authorized user data stored in at least one authorized user data store,
wherein the machine is operable to cause the financial account to be assessed a value associated with cash dispensed,
wherein the machine includes a safe,
wherein the safe includes a lower section,
wherein the lower section is bounded by a lower section top wall, a lower section bottom wall, a lower section front wall, a lower section rear wall, and lower section side walls,
wherein the lower section top wall includes a slot extending therethrough,
wherein the lower section front wall is opposite the lower section rear wall,
wherein the lower section houses the at least one currency cassette,
wherein the lower section houses at least one cash transport,
wherein the at least one cash transport is operable to transport cash removed from the at least one currency cassette through the slot,
wherein the at least one cash transport includes a transport member,
wherein the transport member is movable between a substantially horizontal position and a substantially vertical position,
wherein the transport member is spring biased toward the substantially horizontal position,
wherein the transport member is configured to extend in alignment with the slot when in the substantially vertical position,
wherein the transport member is operable in the substantially vertical position to cause cash in engagement with the at least one cash transport to move in the slot,
wherein the lower section includes a lockable lower section door,
wherein the lower section door is mounted in supporting connection with one of the lower section front wall and the lower section rear wall,
wherein the lower section door in a closed position prevents service provider access to the at least one currency cassette,
wherein the lower section door in an open position allows service provider access to the at least one currency cassette,
wherein the safe includes an upper section,
wherein the upper section is positioned above the lower section,
wherein the upper section is operatively supported by the lower section,
wherein the upper section is bounded by an upper section top wall, an upper section front wall, an upper section rear wall, and upper section side walls,
wherein at least one of the upper section top wall, the upper section front wall, the upper section rear wall, and the upper section side walls are configured to be more susceptible to structural deformation by pressure force than the lower section top wall,
wherein the upper section front wall is opposite the upper section rear wall,
wherein the upper section front wall includes a user accessible opening,
wherein cash extending in the user accessible opening is accessible to a machine user,
wherein the upper section houses a cash stacker, wherein the cash stacker is operable to receive cash transferred from the at least one currency cassette through the slot,
wherein the cash stacker is operable to produce a stack of cash from received cash,
wherein the upper section houses a cash presenter,
wherein the cash presenter includes a gate,
wherein when the cash presenter is in an operational position, the gate is positioned adjacent the user accessible opening,
wherein the gate is moveable between a closed position and an open position,
wherein the cash presenter is operable with the gate in the open position, to make accessible at the user accessible opening to an authorized machine user, a stack of cash produced by the cash stacker,
wherein the cash presenter is operable with the gate in the open position, to retract from the user accessible opening, cash made accessible to an authorized machine user,
wherein the upper section houses at least one divert cassette,
wherein the at least one divert cassette is configured to receive cash diverted from being presented to a machine user,
wherein the at least one divert cassette is configured to receive cash retracted from the user accessible opening by the cash presenter,
wherein the upper section includes a lockable upper section door,
wherein the upper section door is mounted in supporting connection with one of the upper section front wall and the upper section rear wall,
wherein the upper section door in a closed position prevents service provider access to the at least one divert cassette,
wherein the upper section door in an open position allows service provider access to the at least one divert cassette,
wherein the upper section includes at least one slide,
wherein the at least one slide operatively supports the at least one divert cassette, the cash stacker, and the cash presenter,
wherein the at least one slide allows the cash presenter to be moved in operatively supported connection with the safe between
an operational position, wherein the cash presenter is inside the upper section, and
a service position, wherein the cash presenter extends at least partly outside of the upper section,
wherein the machine includes a top housing,
wherein the top housing is positioned above the upper section,
wherein the top housing is operatively supported by the upper section,
wherein the top housing operatively supports the at least one data reader,
wherein the top housing operatively supports at least part of the at least one display.

2. The apparatus according to claim 1 wherein the machine is part of a banking system that includes a plurality of cash dispensing automated banking machines,
wherein the machine is associated with at least one processor,
wherein the at least one data reader includes both
at least one card reader, and
at least one biometric reader,
wherein the at least one processor is operative during a user transaction session with the machine to:
cause card data to be read from a card through operation of the at least one card reader, and then cause the read card data to be compared with card information stored in at least one data store, and
cause biometric data to be read through operation of the at least one biometric reader, and then cause the read biometric data to be compared with biometric information in the at least one data store,
wherein the at least one processor is operative to authorize a machine user to request a transaction responsive at least in part to both:
computer-determined correspondence between the read card data and stored card information, and
computer-determined correspondence between the read biometric data and stored biometric information.

3. The apparatus according to claim 1 wherein the safe is a single unitary unit.

4. The apparatus according to claim 1 wherein the lower section is devoid of an opening that a machine customer is authorized to access.

5. The apparatus according to claim 1 wherein the at least one cash transport is driven by an upper section motor through a transmission arrangement that extends through the slot.

6. The apparatus according to claim 1 wherein the cash presenter is operable with the gate in the open position, to receive through the user accessible opening, cash being deposited by an authorized machine user.

7. The apparatus according to claim 1 wherein the upper section rear wall is adjacent the lower section rear wall, wherein the upper section front wall is adjacent the lower section front wall,
wherein the slot is in a rear portion of the lower section top wall,
wherein the rear portion is adjacent the lower section rear wall.

8. The apparatus according to claim 7 wherein the upper section rear wall is substantially vertically aligned with the lower section rear wall.

9. The apparatus according to claim 7 wherein the upper section front wall includes the upper section door, wherein the upper section door includes the user accessible opening.

10. The apparatus according to claim 1 wherein the top housing is more susceptible to structural deformation by pressure force than the lower section.

11. Apparatus comprising:
an automated banking machine operable to cause financial transfers responsive at least in part to data read from data bearing records,
wherein the machine includes at least one data reader,
wherein the at least one data reader is operable to read user data usable to identify a financial account,
wherein the machine includes a cash dispenser,
wherein the cash dispenser includes at least one currency cassette,
wherein the machine is operable to allow a machine user to carry out a cash dispense transaction on a financial account responsive at least in part to computer-determined correspondence between user data read by the at least one data reader and authorized user data stored in at least one authorized user data store, wherein the machine is operable to cause the financial account to be assessed a value associated with cash dispensed,
wherein the machine includes a top housing,
   wherein the top housing operatively supports the at least one data reader,
wherein the machine includes a safe,
   wherein the safe includes an upper section and a lower section,
      wherein the upper section:
         operatively supports the top housing,
         includes a top interior area,
         includes a front wall,
            wherein the front wall includes a user accessible opening, and
         houses a cash presenter,
            wherein the cash presenter is operable to present cash at the user accessible opening,
      wherein the lower section:
         operatively supports the upper section,
         includes a bottom interior area, and
         houses the at least one currency cassette, at least one alignment cam, and at least one cash transporter,
            wherein the at least one cash transporter includes a transport member,
      wherein the safe includes at least one intermediate wall that separates the top interior area and the bottom interior area,
         wherein the at least one intermediate wall includes a cash transfer slot extending therethrough,
            wherein the transport member is pivotable into an operational position, responsive at least in part to moving engagement with the at least one alignment cam,
            wherein the transport member in the operational position is:
               located adjacent the slot, and
               operable to move cash through the slot.

12. The apparatus according to claim 11 wherein the machine is part of a banking system that includes a plurality of cash dispensing automated banking machines,
   wherein the machine is associated with at least one processor,
   wherein the at least one data reader includes both
      at least one card reader, and
      at least one biometric reader,
   wherein the at least one processor is operative during a user transaction session with the machine to:
      cause card data to be read from a card through operation of the at least one card reader, and then cause the read card data to be compared with card information stored in at least one data store, and
      cause biometric data to be read through operation of the at least one biometric reader, and then cause the read biometric data to be compared with biometric information in the at least one data store,
   wherein the at least one processor is operative to authorize a machine user to request a transaction responsive at least in part to both:
      computer-determined correspondence between the read card data and stored card information, and
      computer-determined correspondence between the read biometric data and stored biometric information.

13. The apparatus according to claim 11 wherein the at least one intermediate wall includes a top wall of the lower section,
   wherein the upper section is bounded by the front wall, an upper wall, a rear wall, and side walls,
      wherein at least one of the front wall, the upper wall, the rear wall, and the side walls are configured to be more susceptible to structural deformation by pressure force than the top wall.

14. The apparatus according to claim 13 wherein the transport member in the operational position extends into the slot.

15. The apparatus according to claim 14 wherein the at least one cash transporter is laterally movable on at least one slide,
   wherein the transport member is pivotable into the operational position, responsive at least in part to lateral movement of the at least one cash transporter.

16. Apparatus comprising:
an automated banking machine operable to carry out financial transactions,
   wherein the machine includes at least one data reader,
      wherein the at least one data reader is operable to read user data usable to identify a financial account,
   wherein the machine includes a cash dispenser,
      wherein the cash dispenser includes at least one currency cassette,
   wherein the machine includes a security vault,
      wherein the vault includes a lower part,
         wherein the lower part includes a top wall, a bottom wall, a front wall, a rear wall, and side walls,
         wherein the front wall is opposite the rear wall,
         wherein the top wall includes a cash transport opening therethrough,
            wherein the cash transport opening is in a rear portion of the top wall,
            wherein the rear portion is adjacent the rear wall,
         wherein the lower part includes a lockable door,
         wherein the lower part houses the at least one currency cassette,
         wherein the lower part is devoid of a machine user-accessible opening,
      wherein the vault includes an upper part,
         wherein the upper part is operatively supported by the lower part,
         wherein the upper part includes an upper wall, a front wall, a rear wall, and side walls,
            wherein the rear wall:
               is opposite the front wall, and
               is substantially aligned with the rear wall of the lower part,
            wherein the front wall:
               is adjacent the front wall of the lower part, and
               includes a machine user-accessible cash outlet opening,
         wherein the upper part houses a cash presenter,
            wherein the cash presenter includes a shutter,
               wherein the shutter is positioned adjacent the cash outlet opening,
            wherein the cash presenter is operable to open and close the shutter,
               wherein with the shutter being open, the cash presenter is operable to
                  present a stack of cash at a machine user-accessible position, and
                  collect presented cash not taken by a machine user,
               wherein with the shutter being closed, the cash presenter is unable to present a stack of cash or collect presented cash, wherein the upper part is predeterminedly configured to offer less resistance to explosive force than the lower part, wherein the vault includes a cash transporter, wherein the cash transporter is operable to move cash from the at least one currency cassette to the cash presenter, wherein the moved cash passes through the cash transport opening, wherein the machine includes a top housing, wherein the top housing is operatively supported by the upper part, wherein the top housing operatively supports the at least one data reader.

17. The apparatus according to claim 16 wherein the machine is part of a banking system that includes a plurality of cash dispensing automated banking machines, wherein the machine is associated with at least one processor, wherein the at least one data reader includes both
  at least one card reader, and
  at least one biometric reader, wherein the at least one processor is operative during a user transaction session with the machine to:
  cause card data to be read from a card through operation of the at least one card reader, and then cause the read card data to be compared with card information stored in at least one data store, and
  cause biometric data to be read through operation of the at least one biometric reader, and then cause the read biometric data to be compared with biometric information in the at least one data store, wherein the at least one processor is operative to authorize a machine user to request a transaction responsive at least in part to both:
  computer-determined correspondence between the read card data and stored card information, and
  computer-determined correspondence between the read biometric data and stored biometric information.

18. The apparatus according to claim 16 wherein at least one of the upper wall, the front wall, the rear wall, and the side walls of the upper part are configured to be more susceptible to structural deformation by pressure force than the top wall.

19. The apparatus according to claim 18 wherein the at least one cash transporter includes a transport member, wherein the transport member is movable between a substantially horizontal position and a substantially vertical position, wherein the transport member is biased toward the substantially horizontal position, wherein the transport member is configured to extend substantially in alignment with the cash transport opening when in the substantially vertical position, wherein the transport member is operable in the substantially vertical position to cause cash in engagement with the at least one cash transporter to move in the cash transport opening.

20. The apparatus according to claim 18 wherein the upper part includes a lockable access door, wherein the lockable access door is positioned above the lockable door of the lower part.

\* \* \* \* \*